(12) United States Patent
Fecteau et al.

(10) Patent No.: US 11,435,218 B2
(45) Date of Patent: Sep. 6, 2022

(54) CAPACITIVE SENSOR DEVICE

(71) Applicant: PITCO FRIALATOR, INC., Bow, NH (US)

(72) Inventors: Michael T. Fecteau, Derry, NH (US); Steven J. Cyr, Londonderry, NH (US); Karl M. Searl, Newmarket, NH (US)

(73) Assignee: PITCO FRIALATOR, INC., Bow, NH (US)

( * ) Notice: Subject to any disclaimer, the term of this patent is extended or adjusted under 35 U.S.C. 154(b) by 0 days.

(21) Appl. No.: 17/047,481

(22) PCT Filed: Apr. 5, 2019

(86) PCT No.: PCT/US2019/026052
§ 371 (c)(1),
(2) Date: Oct. 14, 2020

(87) PCT Pub. No.: WO2019/204059
PCT Pub. Date: Oct. 24, 2019

(65) Prior Publication Data
US 2021/0116285 A1    Apr. 22, 2021

Related U.S. Application Data

(60) Provisional application No. 62/659,447, filed on Apr. 18, 2018.

(51) Int. Cl.
*G01F 23/00*    (2022.01)
*G01F 23/80*    (2022.01)
(Continued)

(52) U.S. Cl.
CPC ........ *G01F 23/804* (2022.01); *A47J 37/1266* (2013.01); *G01F 23/265* (2013.01);
(Continued)

(58) Field of Classification Search
CPC .... G01F 23/804; G01F 23/265; G01F 23/266; G01F 23/268; A47J 2203/00; A47J 37/1266
See application file for complete search history.

(56) References Cited

U.S. PATENT DOCUMENTS 3,641,544 A    2/1972    Radin
4,245,188 A    1/1981    Rottmar
(Continued)

FOREIGN PATENT DOCUMENTS

DE    19756159 C1    6/1999
GB    1523338 A    8/1978

*Primary Examiner* — Francis C Gray
(74) *Attorney, Agent, or Firm* — Seyfarth Shaw LLP; Brian Michaelis

(57) ABSTRACT

A capacitive sensor includes a metal radiator disposed at an extreme end of a sensor assembly. A coaxial electrode is electrically interconnected to the metal radiator. The coaxial electrode has a center conductor, a dielectric around the center conductor, and an outer conductor, the center conductor being in electrical continuity with the metal radiator. An insulator configured to fit adjacent the metal radiator is configured to electrically and thermally isolate the metal radiator from selected electrical and thermal properties in an environment wherein the capacitive sensor probe is disposed. A connector is disposed distal from the metal radiator on the coaxial electrode, a portion of the connector being in electrical continuity with the metal radiator.

18 Claims, 14 Drawing Sheets

(51) Int. Cl.
*A47J 37/12* (2006.01)
*G01F 23/263* (2022.01)

(52) U.S. Cl.
CPC .......... *G01F 23/266* (2013.01); *G01F 23/268* (2013.01); *A47J 2203/00* (2013.01)

(56) References Cited

U.S. PATENT DOCUMENTS

| | | | |
|---|---|---|---|
| 4,806,847 A * | 2/1989 | Atherton | G01F 23/266 |
| | | | 73/304 C |
| 5,477,727 A * | 12/1995 | Koga | H01G 5/0132 |
| | | | 73/304 C |
| 5,532,527 A | 7/1996 | Zatler et al. | |
| 5,973,502 A * | 10/1999 | Bailleul | G01D 5/241 |
| | | | 324/662 |
| 2005/0150292 A1* | 7/2005 | Yamamoto | G01F 23/268 |
| | | | 73/304 R |
| 2006/0185522 A1* | 8/2006 | Shandross | A23L 5/11 |
| | | | 99/330 |
| 2009/0309619 A1 | 12/2009 | Behle et al. | |
| 2015/0027205 A1* | 1/2015 | Brugger | G01N 27/00 |
| | | | 99/403 |
| 2018/0010947 A1 | 1/2018 | Roderes et al. | |
| 2021/0034081 A1* | 2/2021 | Fecteau | G01F 23/268 |
| 2021/0116285 A1* | 4/2021 | Fecteau | G01F 23/266 |
| 2021/0251426 A1* | 8/2021 | Fecteau | G01V 3/08 |

\* cited by examiner

CAPACITIVE SENSOR DEVICE

CROSS-REFERENCE TO RELATED APPLICATION DATA

The present application is a National Stage application of International Application No. PCT/US2019/026052, filed Apr. 5, 2019, which claims priority to U.S. Provisional Patent Application No. 62/659,447, filed Apr. 18, 2018, both of which are incorporated by reference herein in their entireties.

TECHNICAL FIELD

This specification relates to sensors, and in particular a capacitive sensor for use with various control systems.

BACKGROUND

Control systems are known, for controlling operation of energy or heat sources, such as in controlled cooking systems. In some known systems, such as deep flying cooking systems, control systems and associated sensor(s) may be used to control the heat source(s) or burner(s) in operation under certain conditions. For example, in a deep fryer context, a control system and associated sensor(s) may be implemented to prevent a deep flyer from operating when a level of fluid, such as cooking oil or water for cleaning, is below a level needed to effectively remove heat from the burners for heating the fluid for cooking or cleaning.

Known control systems may include sensors, such as level sensors, that directly sense level of fluid based on position of a float on a shaft. In a cooking system context, the environment in which the sensor is used may not be conducive to smooth, continuous operation. For example, in a deep fryer context, debris may be present in the fluid in the system and create impediments to the float riding freely along the shaft. The float may become stuck at a level that does not indicate the actual level of fluid. Sticking floats can create problems in such systems, such as providing for operation of the burner/heater when insufficient fluid is in the system.

Capillary sensors are also known for fluid level sensing. Capillary sensors receive fluid into a capillary tube and determine level as a function of the location of the fluid within the tube. In cooking environments, such as a deep flyer context to determine level of fluid in a fly vat, capillary sensors may be problematic due to differences in viscosity of the fluid that may need to be sensed. For example, some cooking fluids at certain temperatures will be in a partially solid phase so that capillary action within a capillary tube is not effective and level cannot be sensed (e.g. if the fluid is a solid at low temperatures such as is the case with lard).

Also, capillary sensors may retain fluid in the capillary creating unsanitary conditions in use in a food-related context, because spaces within the capillary that retain fluid cannot easily be cleaned. Still further, air pockets or bubbles that may be retained within the capillary will be subject to temperature changes (sometimes extreme) that can cause sensor failure.

BRIEF SUMMARY

The present disclosure provides a sensor and control system that operates across a wide range of viscosities of fluid, from partially solid to low viscosity. The highly reliable and sanitary sensor is implemented as a capacitive sensor that determines capacitance of the fluid that surrounds the sensor. In an illustrative embodiment the sensor according to the disclosure is disposed proximate to a grounded structure of a container within which fluid is contained, e.g. proximate to the wall(s) of a vat or frypot in a deep fryer, wherein fluid in the vat may be fluid for cooking (e.g. cooking oil, lard or the like) or cleaning fluid (e.g. water or the like). The sensor is configured and disposed to sense the capacitance of fluid in which the sensor is located, e.g. between the sensor and wall of the vat or frypot, and thereby determine the relative capacitance of the fluid (and presence or absence of same) in the vat.

The system according to the disclosure comprises the capacitive sensor, in communication with sensor electronics. The sensor electronics interface with a microcontroller or processor that is in communication with an interlock system for control of a subsystem. In the illustrative cooking vat context, the microcontroller is in communication with a heating system interlock that controls, e.g. enables or disables, a heating system such as one or more fuel burners used to heat the fluid in the vat (e.g. for cooking or cleaning).

In operation, in the illustrative embodiment, the capacitance of cooking oil (e.g. heated or around room temperature) is significantly different than the capacitance of air. The capacitance of air is also significantly different than the capacitance of water. The controller, which receives a signal from the sensor electronics that is representative of the measured capacitance from the sensor, can determine the presence (and/or type) of fluid proximate to the sensor and thereby activate the interlock to either allow the heating system (e.g. burners) to operate, or prevent the heating system from operating.

In some embodiments, the sensor may be calibrated such that the sensed capacitance (and therefore the existence and level of fluid proximate to the sensor) is specifically based upon the position of the sensor with respect to the walls and/or structures of the vat or frypot.

In an illustrative embodiment of a deep fryer, the fryer has a vat forming a frypot for receipt of a volume of oil. A sensor is disposed within the vat such that the sensor is disposed in contact with the volume of oil within the frypot when oil is disposed within the frypot. The sensor is configured to detect the presence of oil within the frypot when a level of oil within the frypot is at or above the level of the sensor. The capacitive sensor is in communication with the controller and sends a signal, via sensor electronics, to the controller representative of the presence or absence of oil within the frypot at the level of the sensor. The controller interfaces to a heating system interlock and controls the condition of the interlock. The heating system interlock, in turn, controls operation of one or more heat sources (e.g. burners) that extend through the vat. The condition or state of the interlock enables or disables operation of the one or more heat sources. The controller, based on the signal from the capacitive sensor via sensor electronics, puts the interlock in a state that allows operation of the heat sources when the signal received from the sensor is representative of fluid (e.g. oil for cooking or water for cleaning) being disposed within the frypot at or above the level of the sensor. The controller puts the interlock in a state that prevents operation of the one or more heat sources when the signal received from the sensor indicates that fluid is not disposed within the frypot at or above the level of the sensor.

Advantages of the present disclosure will become more apparent to those skilled in the art from the following description of detailed embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION

Figure 1:
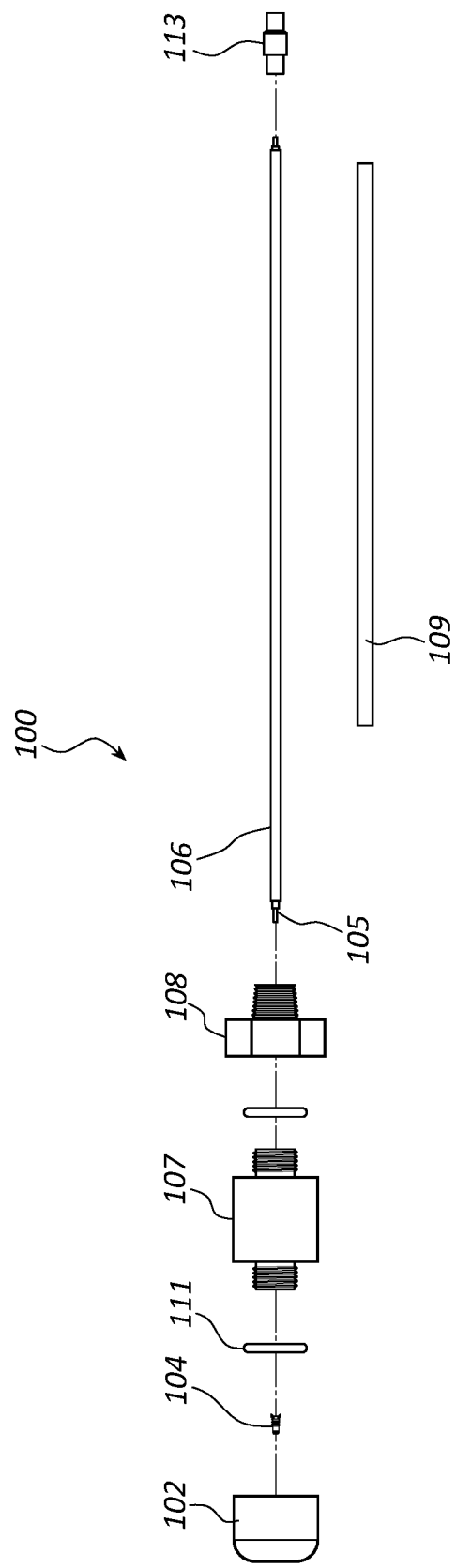
FIG. 1 is an exploded view of a capacitive sensor according to the disclosure.
Figure 2A:
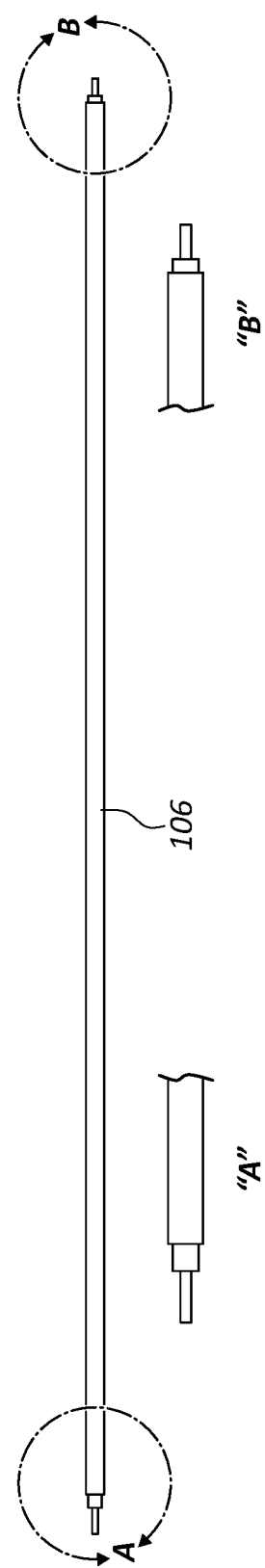
FIGS. 2A-2E are detailed views of components and assemblies of the capacitive sensor of FIG. 1.
Figure 2B:
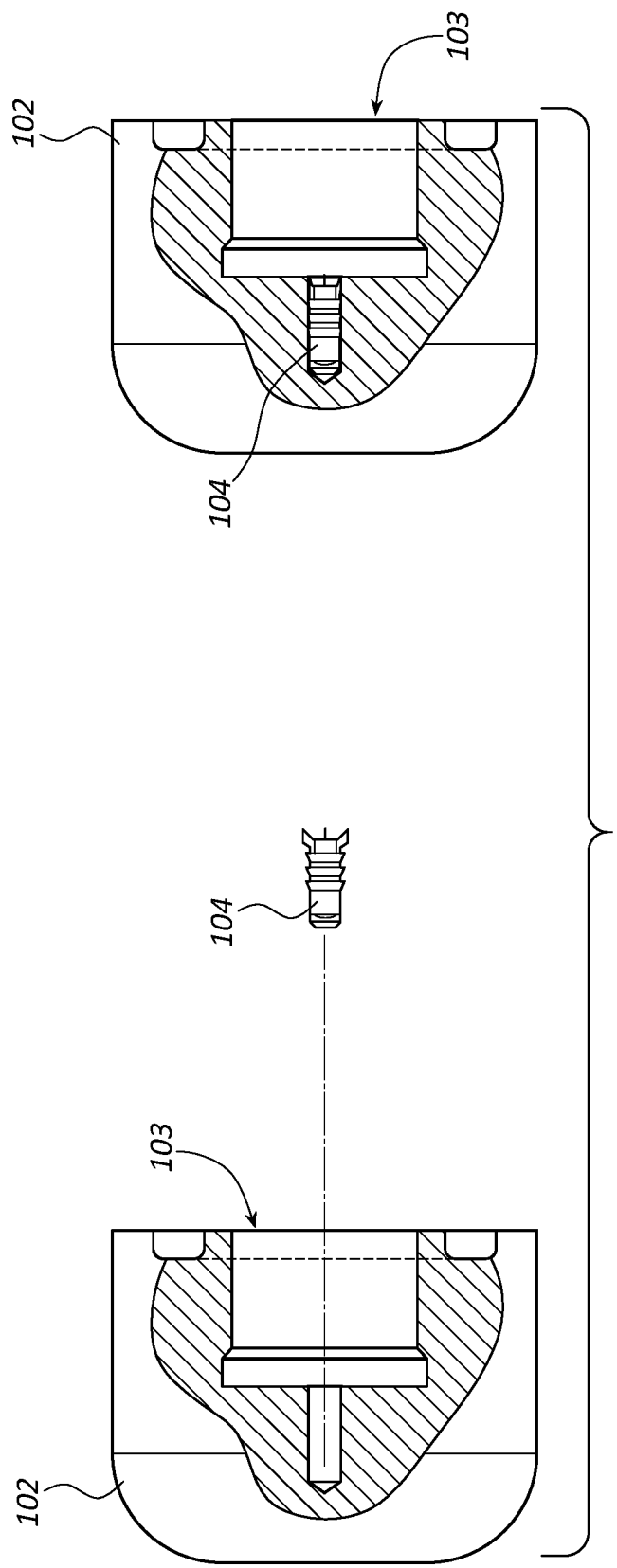
Figure 2C:
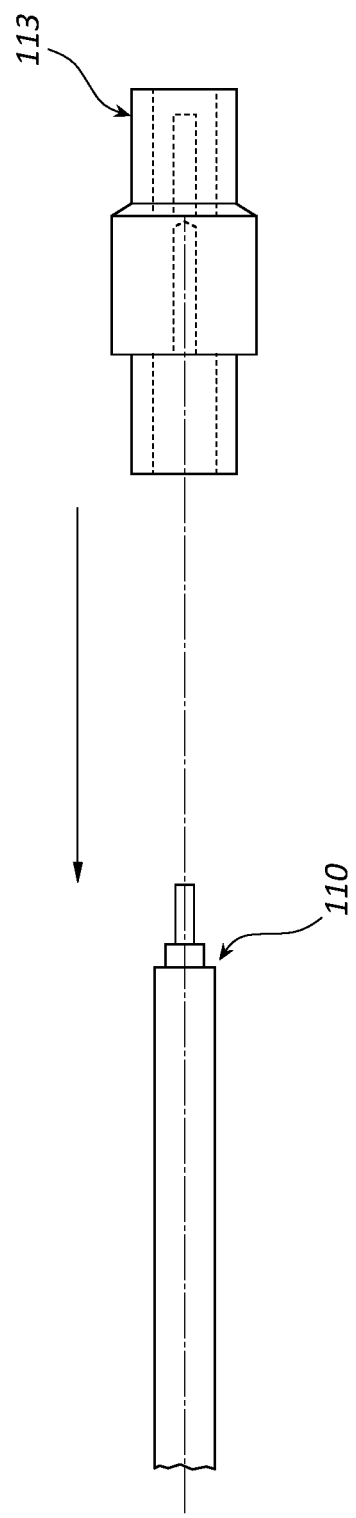
Figure 2D:
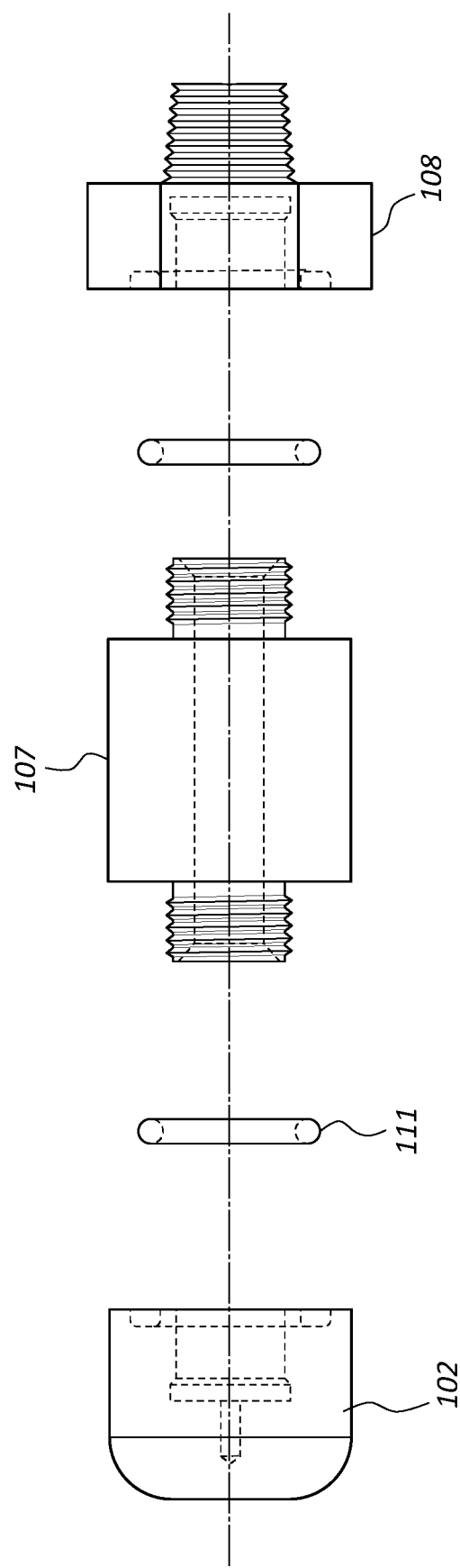
Figure 2E:
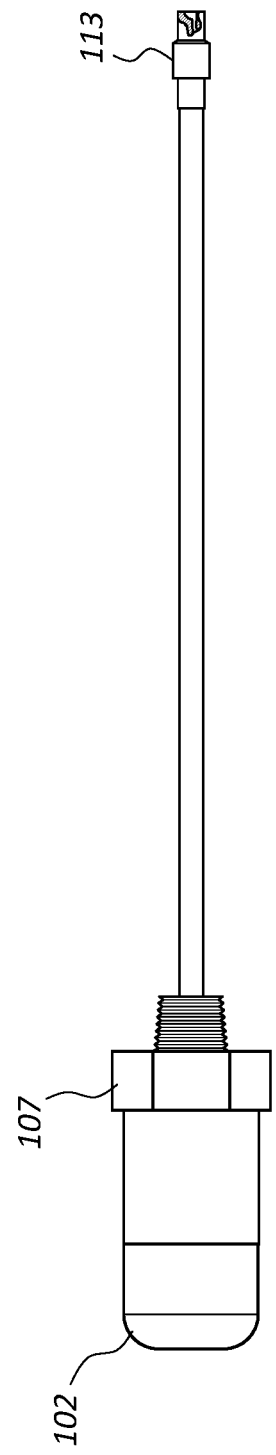

A capacitive sensor probe constructed for installation in a fluid environment, according to the disclosure, is illustrated in FIG. 1. The sensor probe 100 is configured and constructed to operate across a wide range of viscosities of fluid, from partially solid to low viscosity, at a wide range of temperatures, and is generally constructed of materials that are "food safe" as the materials may be used in a cooking environment in contact with foodstuffs. In operation, as described in more detail hereinafter, the capacitive sensor probe acts as a "plate" of a capacitor, in conjunction with a metallic portion of the environment in which the probe 100 is housed (e.g. a portion of a metallic flyer vat) with the fluid disposed in the environment acting as a dielectric of the capacitor.

The sensor 100 is implemented as a capacitive sensor that senses the capacitance of the fluid that surrounds the sensor. In an illustrative embodiment the sensor according to the disclosure is disposed between the walls of a vat, e.g. in a deep fryer, wherein fluid in the vat may be fluid for cooking (e.g. cooking oil, lard or the like) or cleaning fluid (e.g. water or the like). The sensor is configured and disposed to sense the capacitance between the sensor and wall of the vat and thereby determine the relative capacitance of the fluid (or lack of fluid) in the vat, from which it can be determined that sufficient fluid is present in order to provide pertinent information to a control system.

A capacitive sensor probe according to the disclosure is best illustrated in FIGS. 1, 2A-2E and 8A. The sensor 100 may include a metal cylindrical shell or probe radiator 102 that is disposed at an extreme end (e.g. the top) of the sensor assembly. The shell/radiator 102 includes a recess 103 (best seen in FIG. 2B) that receives a receptacle 104 press fit into the shell 102 for electrically conductive engagement with the shell 102. The receptacle 104 is configured to receive a stripped cable end 105 (Detail A of FIG. 2A) of a coaxial cable having a center conductor, dielectric around the center conductor, and outer conductor, forming a coaxial electrode 106. The center conductor is in electrical continuity with the radiator 102. The radiator 102 abuts an insulator 107 that is configured to fit adjacent the radiator. In this illustrative embodiment, the insulator 107 has threads that are configured to thread into the recess 103 of the radiator 102. An O-ring 111 may be disposed between the radiator 102 and insulator 107. The insulator 107 may be made from PTFE, PEEK or other materials that insulate against electrical transmission and/or heat transmission and are also capable of withstanding temperatures such as up to about 500 degrees Fahrenheit. A sensor mount 108 is disposed adjacent to and abuts the insulator 107 and may have an O-ring disposed therebetween. The insulator 107 and sensor mount 108 are hollow so that the coaxial electrode 106 can extend through those bodies. The coaxial electrode 106 may be encased in PTFE heat shrink tube 109. A stripped cable end 110 of the coaxial electrode 106, distal from the radiator 102 is connected to a connector jack 113, with the outer conductor of the coaxial cable in electrical continuity with a shell portion of the connector jack 113. In some embodiments of the capacitive sensor 100, a fitting (not shown in FIGS. 1, 2A-2E and 8A) may be provided below the radiator 102 or below the insulator 107, to configure the sensor 100 to be attached to and removed from a standpipe for inspection, cleaning, replacement or the like.

Figure 3:
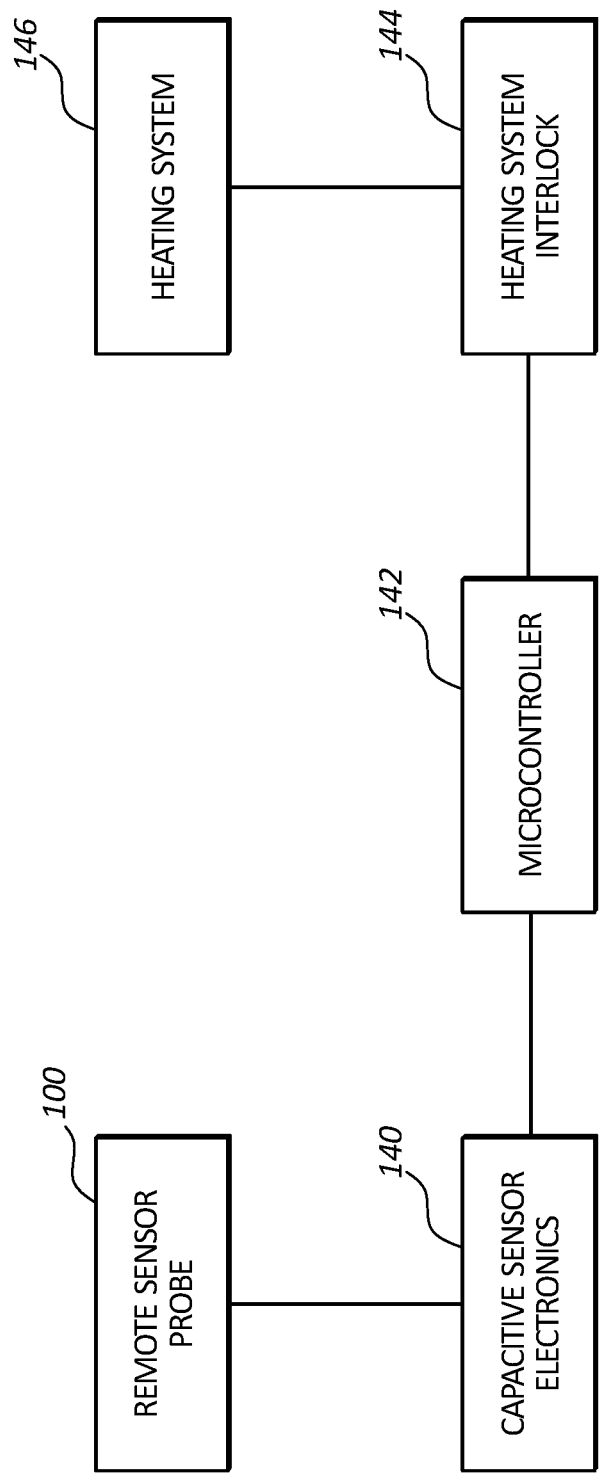
FIG. 3 is a functional block diagram of a control system utilizing the capacitive sensor of FIG. 1.

As illustrated in FIG. 3, in the system according to the disclosure the capacitive sensor probe 100 is in electrical/electronic communication with sensor electronics 140. The sensor electronics may comprise capacitive sensor electronics in electrical communication with the sensor probe 100. In an illustrative embodiment the sensor electronics 140 includes a Texas Instruments FDC1004 4-channel capacitance-to-digital converter integrated circuit (IC), or substantial equivalent. A capacitive channel of the IC is electrically connected to the inner conductor of the coaxial electrode 106 which is in turn connected to the radiator 102 of the sensor probe 100. The IC and metallic portion(s) of the tank are grounded to a common ground. The outer conductor of the coaxial electrode 106 is electrically connected with the IC as an active or sensing shield to reduce electromagnetic interference and parasitic capacitance from sources other than the sensor probe 100. The sensor electronics 140 converts the analog capacitive signal generated by the sensor electronics into a digital signal for communication, via a I²C serial bus, to a microcontroller or processor 142.

Referring still to FIG. 3, the microcontroller 142, for example a STM32 family microcontroller available from STMicroelectronics, Geneva, Switzerland, receives the digital signal from the sensor electronics 140. The digital signal is representative of a level of capacitance created by the fluid surrounding the sensor probe 100, and is communicated to the microcontroller 142 as a capacitive value. The microcontroller 142 is in communication with an interlock system (e.g. a heating interlock system) 144, which controls (enables/disables) a heating system 146 in communication with the interlock system 142.

Figure 4:
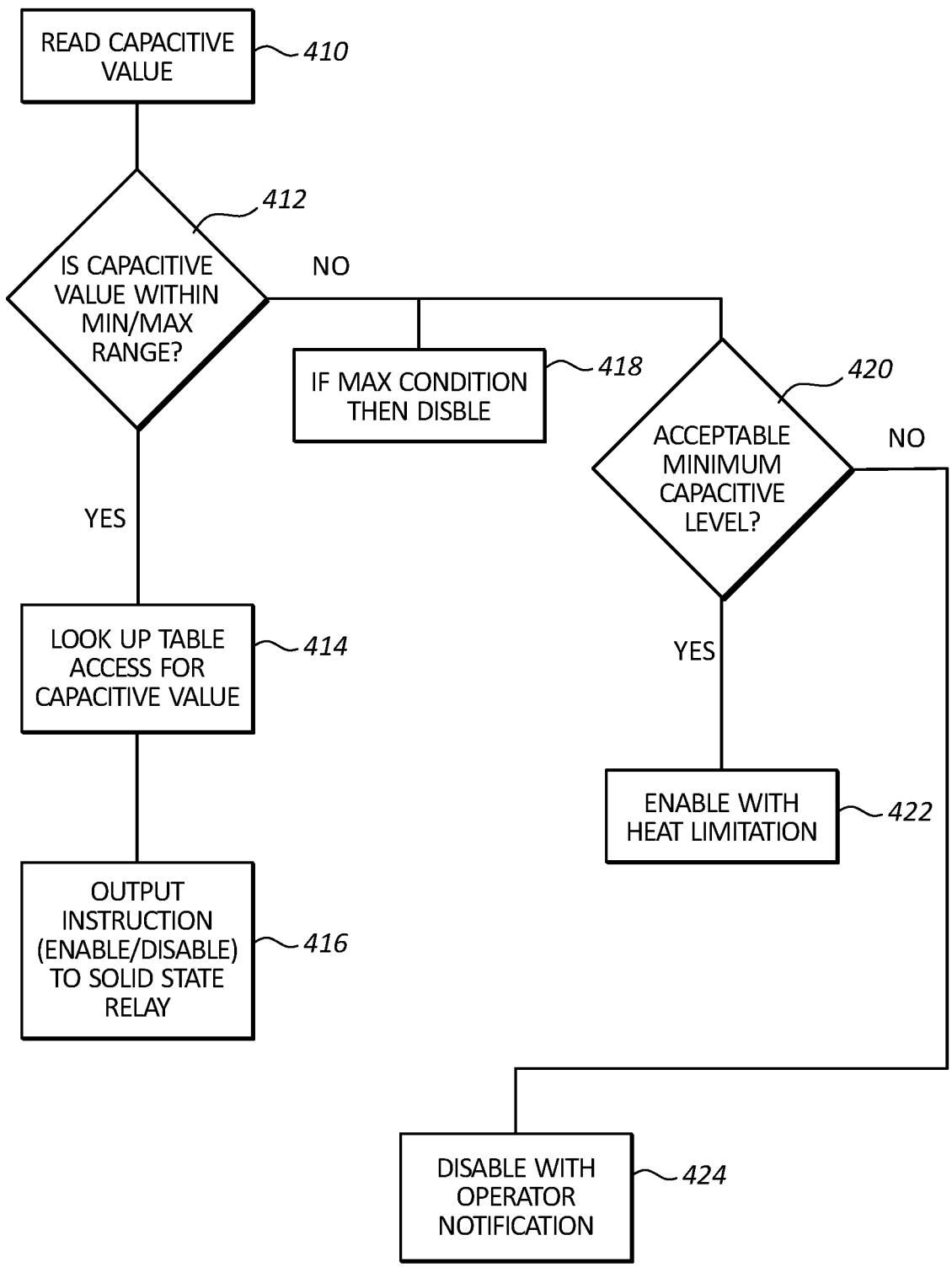
FIG. 4 is a flow diagram of operation of the capacitive sensor of FIG. 1 controlled by the control system of FIG. 3.

Referring now to FIG. 4, illustrative processing by the microcontroller 142 is illustrated. The microcontroller 142 reads the digital capacitive value 410 from the sensor electronics 140. The illustrative control processing, implemented by microcontroller program code, then determines if the capacitive value is within a minimum and maximum acceptable range of the sensor probe 100 and sensor electronics 140. An illustrative acceptable range for a capacitance determination in a fryer vat application may be, for example 0 picofarad (pF) (minimum) to 16 pF (maximum).

If the capacitive value is within the min/max range, then the controller may access a lookup table 414 and determine the appropriate operation or control signal to output 416 to the interlock system (e.g. to enable or disable) the interlock 144 for control of the heating system 146. In an illustrative implementation, the interlock system 144 may include a solid state relay to enable or disable the heating system 146.

Still referring to FIG. 4, if the capacitive value read by the microcontroller 142 is not within the min/max range, and exceeds a maximum acceptable capacitive value (indicating a condition exists that is outside the design specifications of the capacitive sensor probe 100 and electronics 140), then the microcontroller issues a control signal that may disable or reduce operation of the heating system or it may notify an operator. In such a case, the microcontroller 142 may prompt an operator for a decision to maintain or disable operation. In an embodiment, if the capacitive value read by the microcontroller 142 is not within the min/max range, and exceeds a maximum acceptable capacitive value (indicating a condition exists that is outside the design specifications of the capacitive sensor probe 100 and electronics 140), then the microcontroller disables 418 the interlock 144 which in turn disables the heating system. A determination may be made to determine if the capacitive value read by the microcontroller 142 is at an acceptable minimum capacitive value 420. The microcontroller 142 may be programmed to determine if the capacitive value is at or near a minimum acceptable level, and if so to enable the interlock 144 but to control the heating system with a heat limitation 422. Alternatively, if the capacitive value is not at or near a minimum acceptable level (e.g. is far below a minimum acceptable level) then the interlock 144 may be disabled and the controller may issue an operator notification 424.

In an illustrative cooking context (e.g. where the capacitive sensor 100 is disposed in a cooking vat or frypot as described in detail hereinafter), the microcontroller 142 is in communication with a heating system interlock 144 that controls, e.g. enables or disables, a heating system such as one or more fuel burners used to heat the fluid in a cooking environment, for example where a fluid may be present for cooking or cleaning. As a function of the capacitive value received by the microcontroller 142, the microcontroller sends a signal to the heating system interlock 144.

The sensed capacitance of cooking oil (e.g. heated or around room temperature) is significantly different than the capacitance of air. The capacitance of air is also significantly different than the capacitance of water (or water with a cleaning solution or the like). The controller 142, which receives the capacitive value signal from the sensor electronics 140 that is representative of the measured capacitance from the sensor 100, can determine the presence (and in some configurations the type) of fluid proximate to the sensor and thereby activate the interlock to either allow the heating system (e.g. burners) to operate, or prevent the heating system from operating.

Turning now to FIGS. 5-9, a deep fryer 10 embodiment is illustrated in greater detail implementing the capacitive sensor 100 and control system according to the disclosure. The deep fryer a vat 42 that receives and holds a volume of cooking oil or other cooking medium/liquid for cooking food to be introduced into the deep flyer. A heat source 32 is configured to apply heat to the cooking oil disposed within the vat 42. The vat 42 is configured to receive one or more baskets (not shown) that hold food product to be cooked by contact or submersion in the heated cooking liquid for a desired period of time.

The fryer 10 may be heated with the heat source 32, for example gas burners or electrical heating elements, to produce heat that is transferred to the cooking oil. In embodiments where gas burners are used, the burners may be positioned to ignite a flame outside of the vat 42, with the combustion products sent through burner tubes 32 that extend beneath the vat, with the surfaces of the burner tube 32 transferring heat to the cooking liquid. In embodiments where electrical heaters are used, the heaters may be disposed directly within the vat such that the surface of the heaters contact cooking liquid for transfer of heat to the cooking liquid.

Gas burners or electrical heaters both produce a large amount of heat during operation to heat cooking liquid to cook food. In some embodiments where the cooking liquid is cooking oil, the heat sources operate to heat the cooking oil within the vat to temperatures, for example, in the range of 350 to 400 degrees Fahrenheit. In order for the bulk cooking oil temperature within the vat 42 to reach this temperature range, the heater sources need to be operate at higher temperatures than this range in order to transfer heat from the heat sources to the cooking oil. It is important during operation of burner systems and electric heaters that the heat generated by these burners/heaters be removed from the components during operation to prevent an excessive temperature of the components, which can cause unsafe conditions such as failure or damage to the components of the fryer or a fire hazard. Operation of the burners or heaters in the fryer 10 with minimal to no fluid, e.g. cooking oil or cleaning fluid, in the vat 42 causes undesirable heat build-up during operation. Accordingly, implementation of the capacitive sensor 100 and control system as described herein prevents heating sources from operating when the vat 42 does not include sufficient fluid to remove heat. However, it should be appreciated that the capacitive sensor and control system described herein may be implemented in other contexts where an interlock (e.g. enable/disable mechanism) may be used and a capacitive value of a fluid within a receptacle can be used to control the interlock (for example, any of various systems with a fluid reservoir and delivery control components, or the like). It should be noted that the same operation as described will apply in other contexts as well, such as when cleaning fluid is present, or not, in the vat for purposes of operation to clean the vat.

Figure 5:
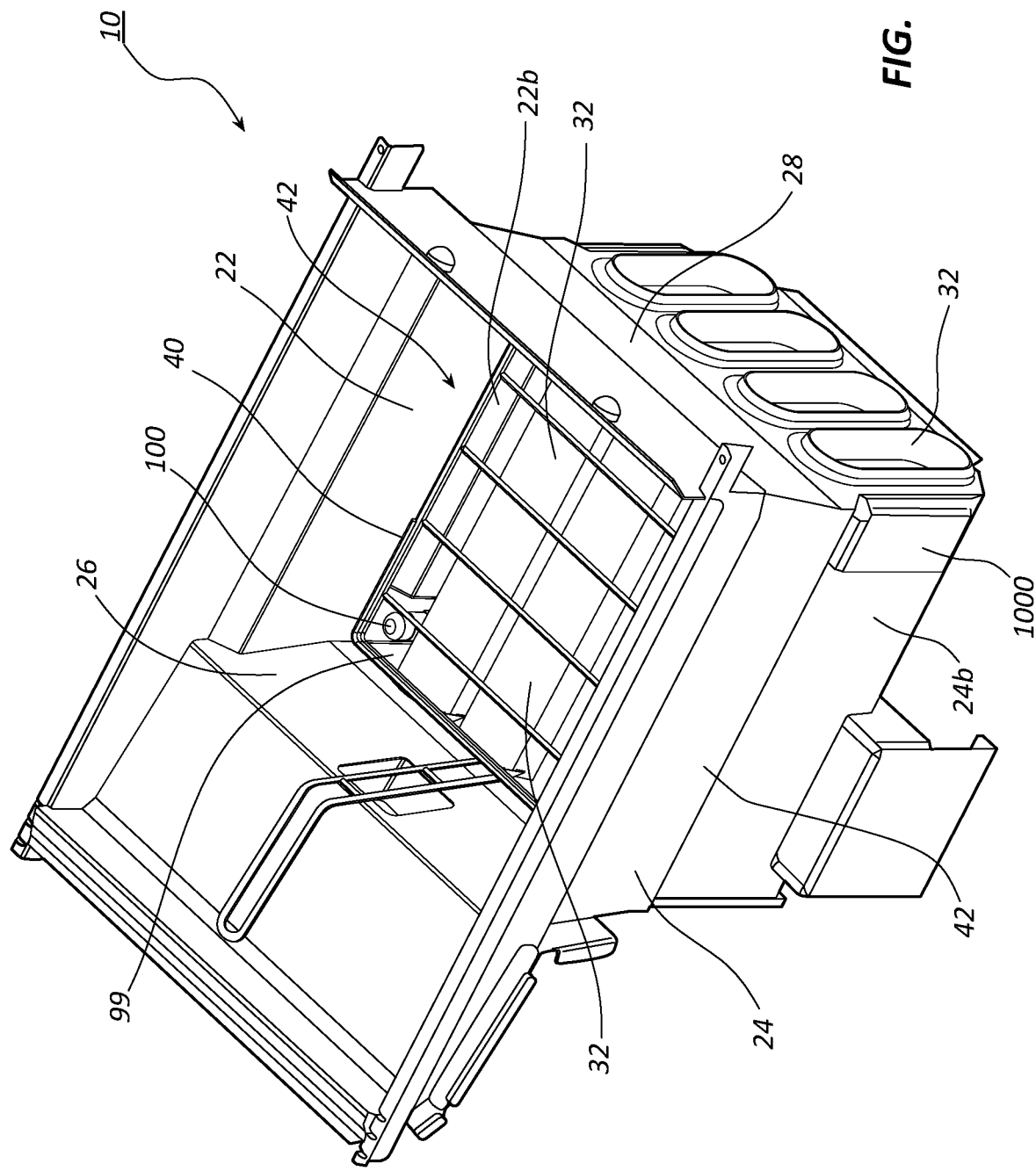
FIG. 5. is a perspective view of an illustrative embodiment of a deep fryer with a capacitive sensor according to the disclosure for determining the existence of oil within the frypot.
Figure 6:
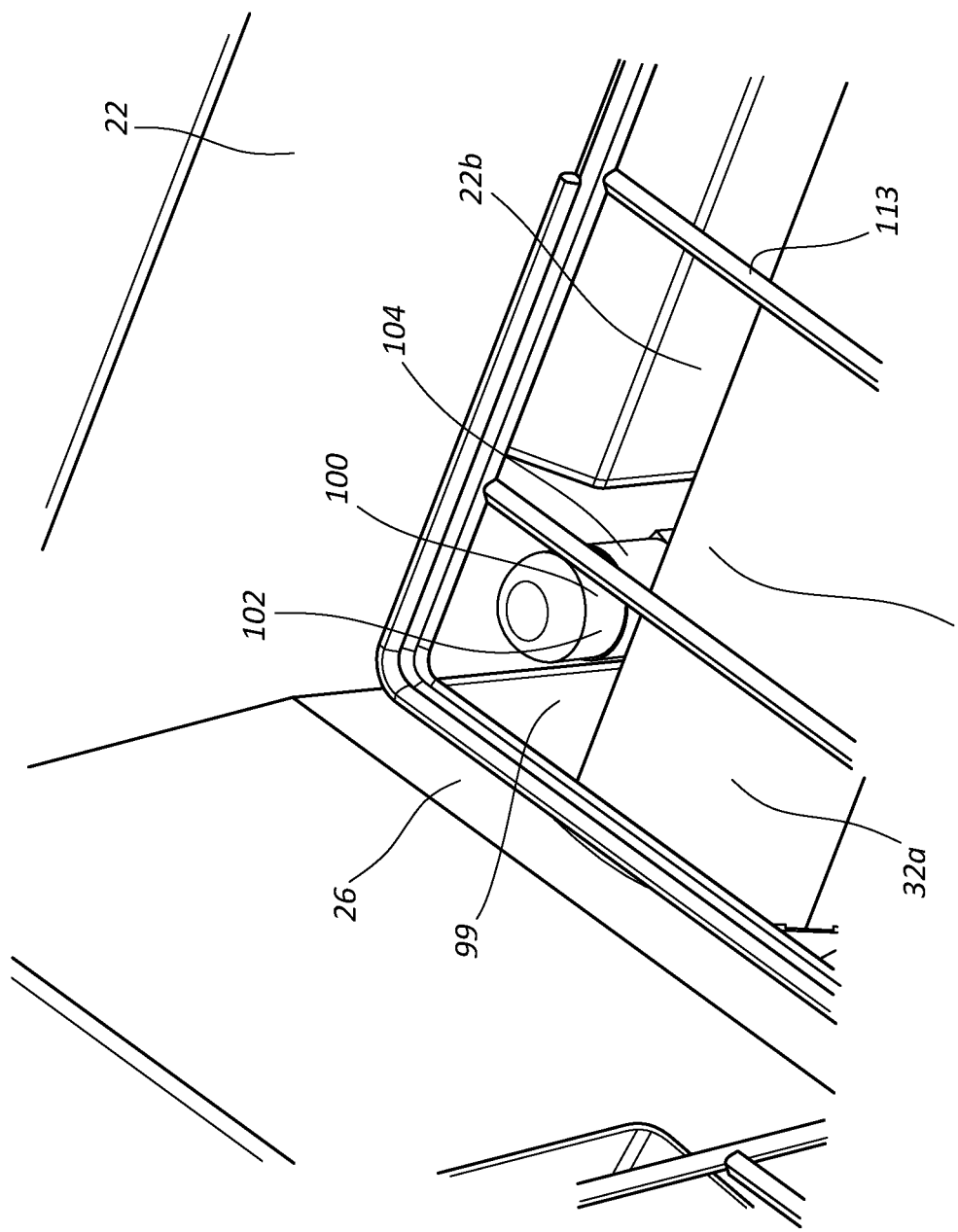
FIG. 6 is a detail view of FIG. 5.

As illustrated, e.g. in FIG. 5, the flyer 10 with burner interlock includes a vat 42. The vat includes a front wall 26, opposite right and left side walls 22, 24, and a rear wall 28. Burner tubes 32 extend through a bottom portion of the vat 42, typically through the front and back walls 26, 28. A grate 40 may be provided above the burner tubes 32, with the grate 40 providing a surface that a flyer basket (not shown but conventional) can rest upon when food within basket is being fried within the cooking oil, and specifically heated cooking oil that is disposed above the burner tubes 32.

The capacitive sensor 100, as described hereinbefore in relation to FIGS. 1, 2A-2E, and 3, is disposed within the vat 42 in a position with the radiator (102, best shown in FIG. 1) at a level representative of the desired minimum cooking oil level within the vat for needed heat removal from the burner tubes 32 for safe operation. The sensor 100 is provided to detect the presence of cooking oil at a necessary level for safe operation, and to provide a signal to a microcontroller 142 (FIG. 3). The sensor, via the sensor electronics 140 (described hereinbefore), provides the controller 142 with a capacitive value signal that is representative of the presence or absence of cooking oil proximate to the sensor at the necessary level within the vat 42. The microcontroller 142 receives the capacitive value signal and based upon the signal received either provides control signals to the heating system interlock 144 to allow operation of the burners (when the signal indicates that cooking oil is present at the necessary level) or prevents operation of the burners (when the signal indicates that cooking oil is not present at the necessary level).

Figure 7:
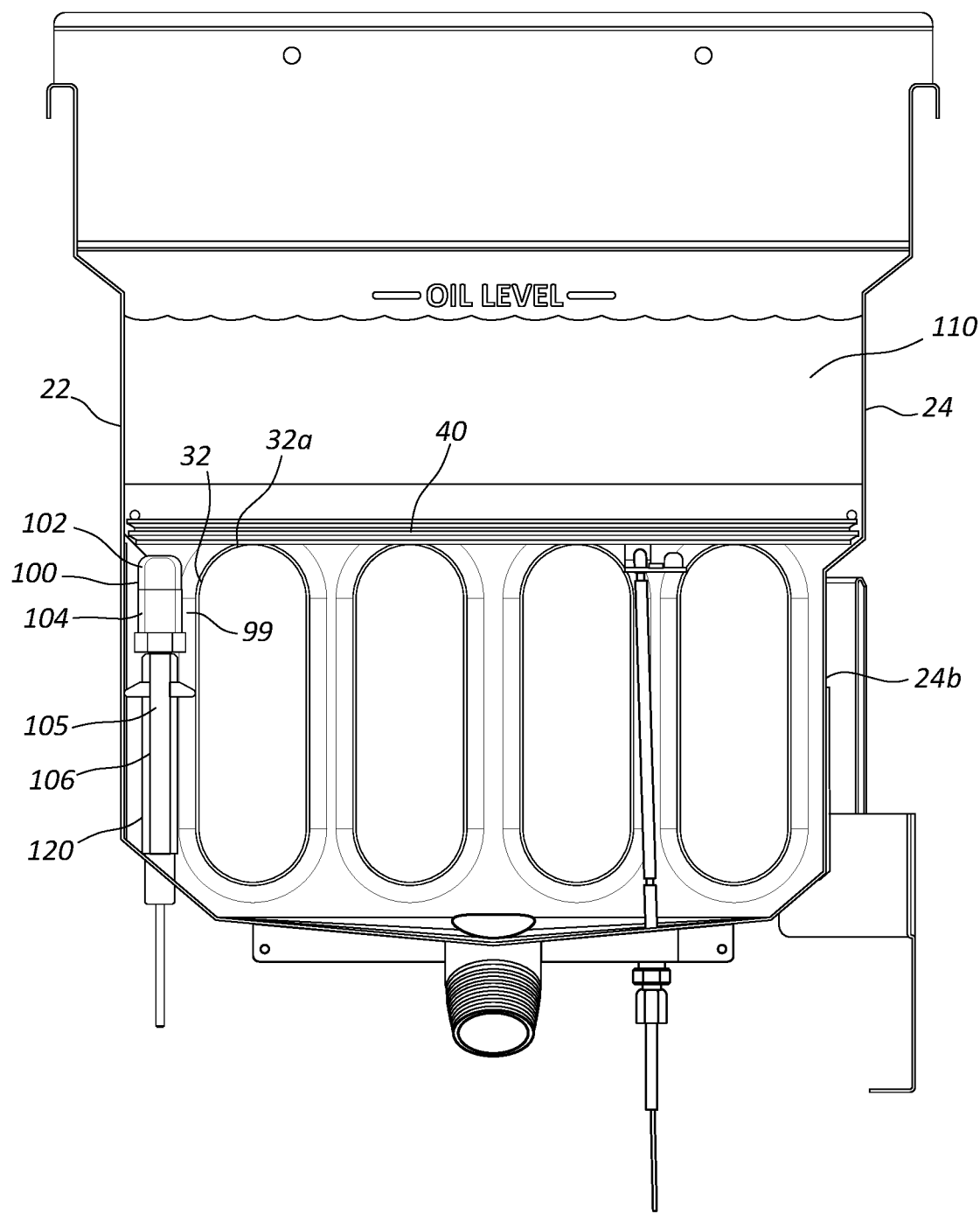
FIG. 7 is a front cross-sectional view of the frypot of FIG. 5.

An example location of the capacitive sensor according to the disclosure is illustrated in FIGS. 6 through 9. As illustrated in FIG. 7, in the context of a cooking oil vat, a portion of the sensor 100 may rest on a standtube 120 that extends within the vat. The standtube 120 is of a height that places the radiator 102 of the sensor 100 at a height optimized for the proper fluid level. The coaxial communications cable 106 extends through the standtube 120 and is connected to the sensor electronics (140, FIG. 3) which is in turn electrically connected to the microcontroller 142. The capacitive sensor 100 produces a capacitive value as a function of the fluid that surrounds the sensor, i.e. between the sensor and the walls of the vat (in the location depicted in the figures the front 26 and adjacent wall 22 of the vat 46), with the sensor probe acting as one plate of a capacitor and the wall(s) of the vat acting as a second plate of the capacitor. The capacitance of cooking oil (heated or around room temperature) is significantly different than the capacitance of air, such that the microcontroller 142, receives a capacitive value signal that is representative of the measured capacitance of the fluid present. Based on the capacitive value, the microcontroller 142 sends control signals to the heating system interlock 144 to either allow the burners to operate, or prevent the burners from operating. It should be appreciated that with appropriate programming, the microcontroller 142 may determine what type of fluid is proximate to the sensor or may determine the presence of debris or other material within the fluid.

In some embodiments, the sensor 100 may be calibrated such that the sensed capacitance (and therefore the existence and level of fluid proximate to the sensor) is specifically based upon positioning of the sensor 100 within the vat. That is, sensed capacitive value may be a function of the position of the sensor with respect to, for example, a walls of the vat (22, 26), or in another example the side wall of a burner tube 32. While the system may be calibrated based upon the specific position of the sensor within the vat, in relation to a structure of the vat, one of ordinary skill in the art should appreciate that calibration may be based on non-vat structures placed in proximity to the sensor and made a part of the circuit/system as described herein. Generally, sufficient space should exist between the sensor and the structure (e.g. wall) for an amount of fluid to be positioned between the sensor and structure for a reliable and repeatable capacitance level of fluid, e.g. cooking oil, to be achieved.

As described, the microcontroller receives a signal from the sensor 100, via the sensor electronics 140, that is proportional to the capacitance of fluid present, which capacitance may be calibrated based on the type of fluid. Memory in association with the microcontroller (e.g. a look-up table) maintains capacitance information based upon type of fluid, e.g. appropriate ranges or "windows" of capacitive value, that are correlated to control signals to send to the system interlock 144, to either allow or prevent burner operation. based upon the determined type of fluid.

Figure 8:
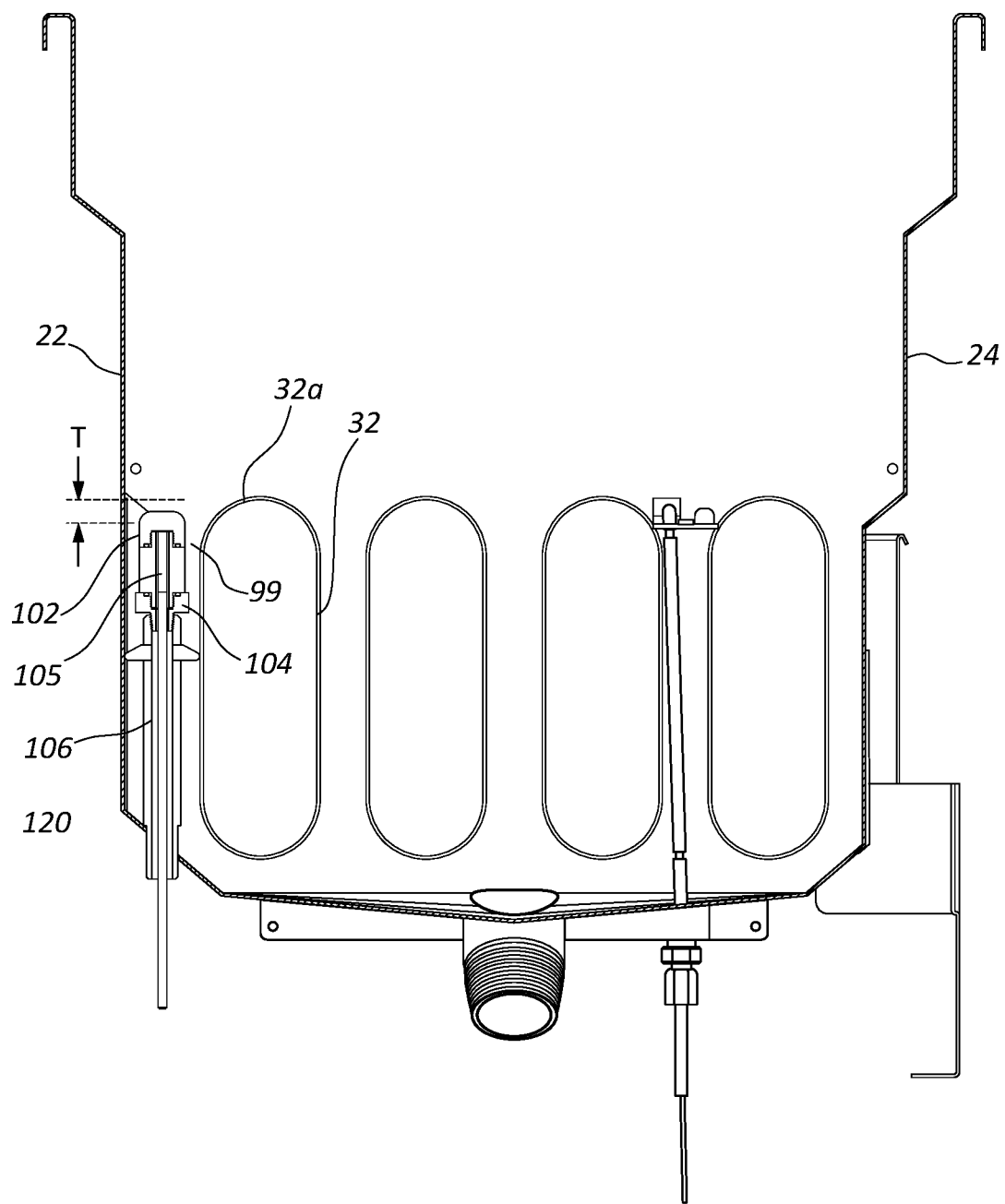
FIG. 8 is another front cross-sectional view of the frypot of FIG. 5.
Figure 8A:
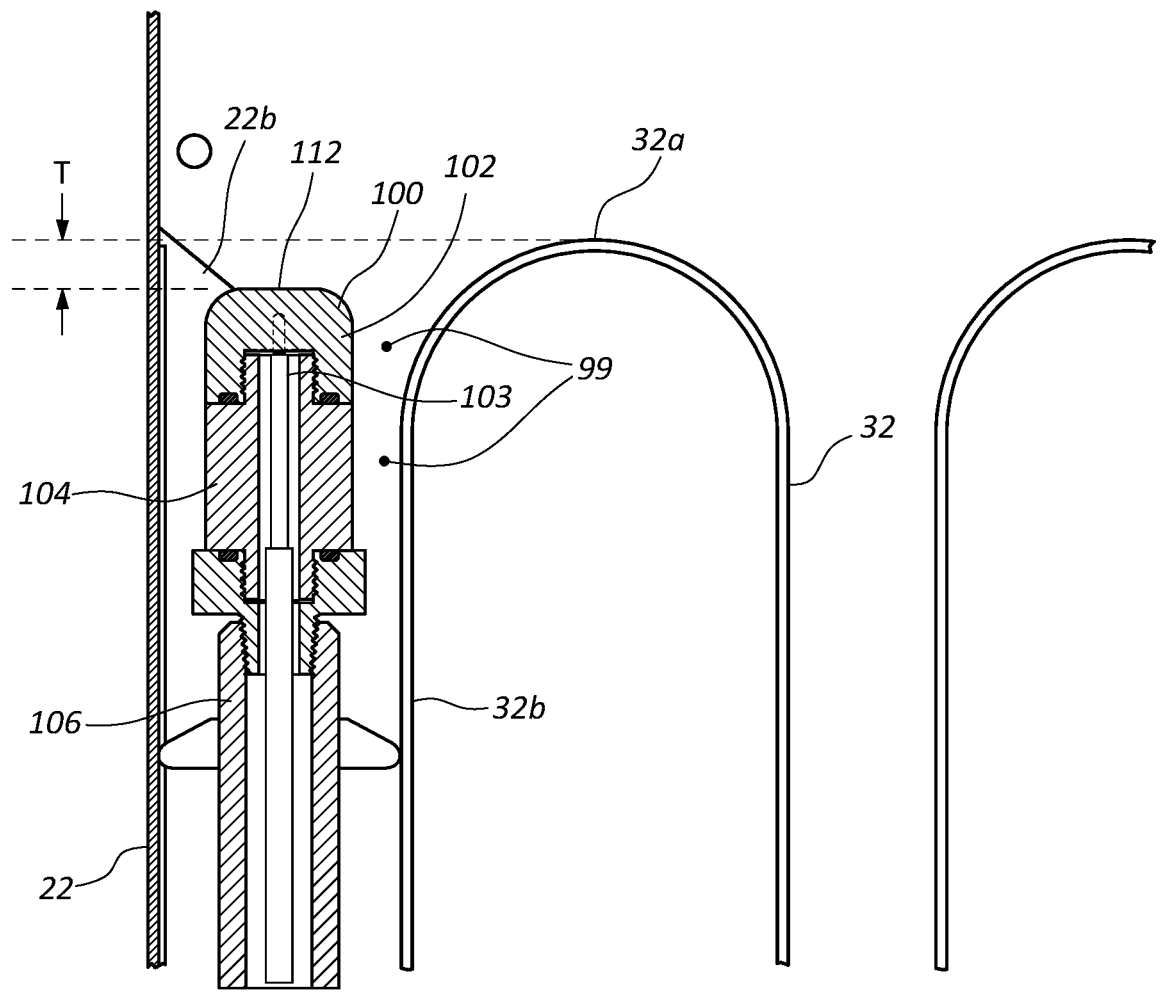
FIG. 8a is a detail view of the view of FIG. 8.
Figure 9:
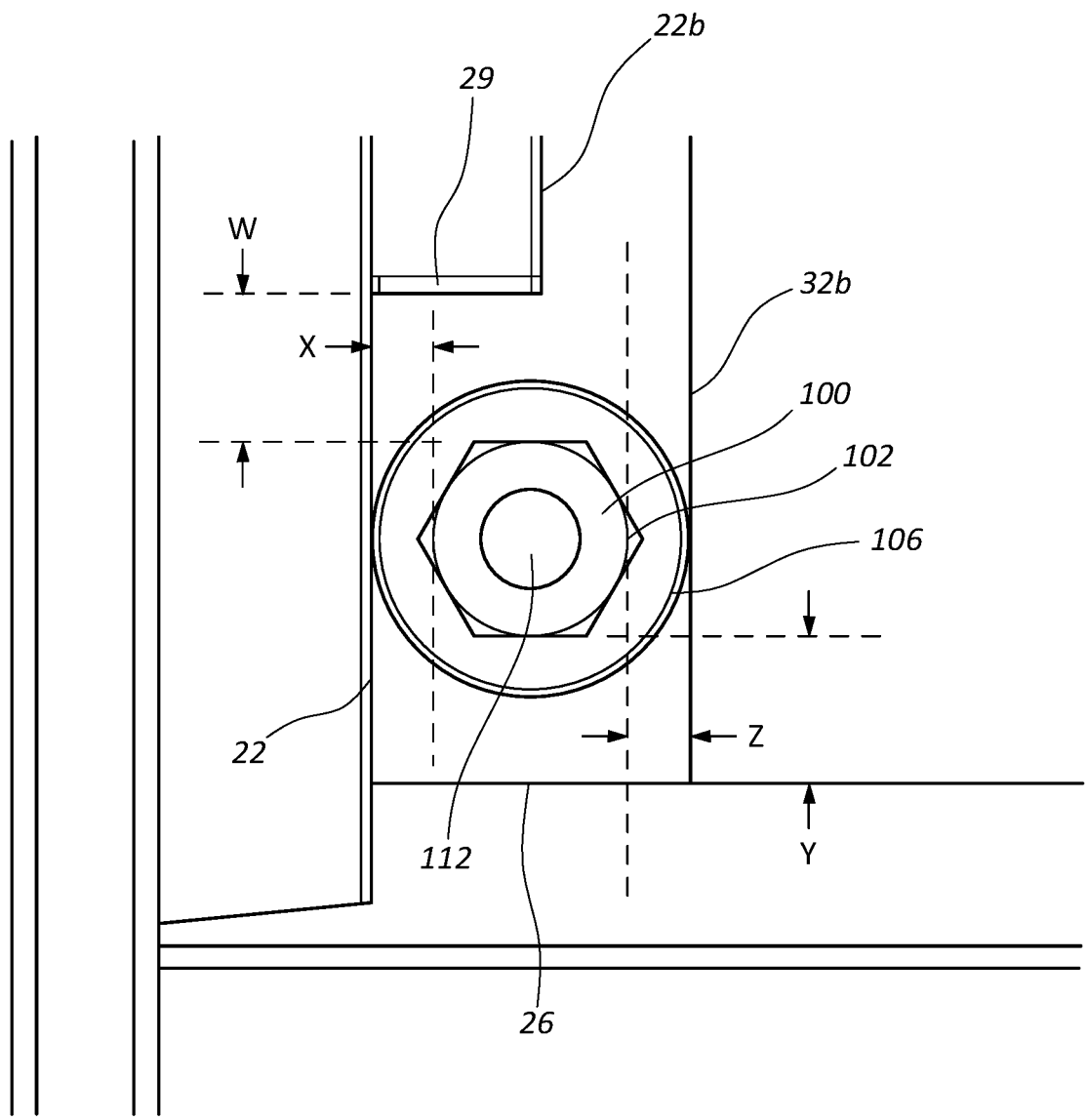
FIG. 9 is a top view of a portion of the frypot, with the wire rack removed for clarity.

In a specific illustrative embodiment, the sensor may be positioned as depicted in FIGS. 8, 8A and 9, with the sensor 100 disposed within a space 99 within the vat 42 that is proximate to the side wall 32b of the burner tube, and the front and right walls 26, 22 of the vat 42. This positioning allows for the sensor 100 to interact with the cooking oil (or lack thereof) within the vat 42, yet be protected by the walls of the vat and the side of the burner tube to minimize damage during use of the fryer 10. As illustrated, the sensor may be positioned with its center 112 substantially evenly spaced between the right side wall 22 and the adjacent burner tube 32, as depicted with the space X. In this example, the center 112 of the sensor 100 is disposed approximately 0.9 inches from the right side wall 22 and approximately 0.9 inches from the burner tube 32 (distance Z). The outer circumference of the sensor 100, and specifically the radiator 102) in this illustrative embodiment is approximately 0.75 inches, establishing a space of approximately 0.52 inches between the outer wall of the radiator 102 and the right wall 22 and as well as the burner tube 32. In this embodiment, the center 112 of the sensor is positioned approximately 0.6 inches from the front wall 26 of the vat 42 (Y), as well as approximately 0.6 inches from a wall 29 that is substantially parallel to the front wall 26 and forms the side of an inward indentation 22b of the right side wall 22 (W) as discussed below. With an amount of cooking oil disposed in the space between the radiator 102 and the various walls of the vat 42 and side wall of the burner tube 32, a capacitance value of a particular fluid within the space (i.e. cooking oil) is significantly different than a sensed capacitance of air disposed in the space between the radiator and the walls of the vat 42. Similarly, the sensed capacitive value of that fluid (e.g. cooking oil) is significantly different than a sensed capacitance of water that might otherwise be disposed in the space (e.g. for a cleaning operation).

As shown in FIGS. 8 and 8A, in this example embodiment the sensor 100 is positioned vertically with respect to the top surface 32a of the burner tube 32 that is proximate to the sensor 100. The top of the sensor may be aligned to be just below the top surface 32a of the burner tube as depicted by distance T. The distance T may be approximately 0.25 inches. In other embodiments, the top of the sensor 100 may be at the same height as the top surface 32a of the burner tube 32 (i.e. the distance T is 0 inches). In such an embodiment, the sensor 100 may be no higher than the top surface 32a of the burner tubes 32 to avoid the sensor interacting with a frybasket disposed within the vat 42 (which normally rests upon the wire rack 40, best seen in FIGS. 5 and 6).

The vertical position of the sensor 100 within the vat 42 may generally be aligned with the top surface 32a of the burner tube 32 such that the presence or absence of oil, based upon the capacitance measured by the sensor 100, is representative of the level of oil that would be needed to cover the burner tubes in order to sufficiently remove heat away from the burner tube 32 and transfer that heat to the cooking oil within the vat 42.

In some embodiments, the sensor 100 and system may be calibrated to provide a signal that is understood by the controller that cooking oil surrounds the sensor 100 when the sensor 100 is fully covered by cooking oil (in some embodiments, specifically the radiator shell 102), i.e. cooking oil surrounds the entire circumferential side surface of the sensor 100. In some embodiments, the sensor 100 and system may be calibrated to provide a signal that is understood by the controller that cooking oil surrounds the sensor 100 when about 90% of the vertical height, or in other embodiments 90% of the total circumferential area, of the sensor 100 is surrounded by cooking oil. Other calibrations may be contemplated and within the scope of the disclosure.

While the embodiments depicted in FIGS. 8, 8A and 9 and discussed herein include a sensor disposed in particular position within the vat, it should be appreciated by those skilled in the art that the sensor may be located or otherwise disposed at other locations in the vat.

In some embodiments, the controller may be programmed to provide an error message to the user (by way of a message board, digital readout, warning light, or the like when the measured capacitance does not fall within a value (or range of values) of calibrated capacitance of cooking oil (room temperature through hot), water, or air. In this case, it is possible that the sensor 100 is not operating properly, or it is possible that the surfaces of the sensor 100 or perhaps the surfaces of the walls that are proximate to the sensor 100 (side wall 22, burner tube 32, or the like) are covered with foreign materials such that the measured capacitance differs from the normally calibrated capacitance. The error message may prompt the user to investigate the cause, and to take steps to cure same, e.g. mechanically cleaning the surface of the sensor 100 or the walls of the vat 42 to try to clear the error message.

As shown in FIGS. 7-9, in some embodiments, the right and left side walls 22, 24 may be configured to maximize the amount of oil that is disposed within the vat 42 above the burner tubes and minimize the amount of oil that is within the vat on the sides of the burner tubes 32. This construction improves the circulation of oil within the vat and minimizes the localized heating of oil for a longer oil life. In some embodiments, the right and left side walls may include a narrowed region 22b (left side 24 wall has the same design as the right wall 22) where the portion of the right wall 22b that is aligned with the sides of the burner tubes 32 extends inwardly to minimize the space between the right wall and the side of the burner tube 32, while allowing the volume of the vat above the burner tubes to be wider above the burner tubes.

Although the sensor as described herein is configured and disposed to sense the capacitance between the sensor and wall of the vat in the illustrative embodiment, and thereby determine the relative capacitance of the fluid (or lack of fluid) in the vat, from which it can be determined that sufficient fluid is present in order to provide pertinent information to a control system, it should be appreciated by those skilled in the art that rather than a metallic/conductive wall of the vat the sensor may be used as described to determine capacitance between the sensor and another structure, and the capacitive sensor and control system according to the disclosure may be used in a different context other than a frying vat. For example, in a non-flyer context (or non-metallic or metallic reservoir context), a conductive structure may be provided (rather than a wall of the context structure) proximate to the sensor, and operate in accordance with the disclosure to sense capacitance of the content of the reservoir.

While the interlock system and heating system are described and illustrated herein as discrete systems, it should be appreciated that the interlock mechanism controlling the controlled system (e.g. heating system), as a result of the capacitive value, may be an integrated system with the interlock mechanism as an integrated part of the controlled, e.g. heating/burner, system.

While various embodiments are disclosed herein, it should be understood that the invention is not so limited and modifications may be made without departing from the disclosure. The scope of the disclosure is defined by the appended claims, and all devices that come within the meaning of the claims, either literally or by equivalence, are intended to be embraced therein.

What is claimed is:

1. A capacitive sensor probe, for sensing liquid levels within a deep fryer vat, comprising:
   a metal cylindrical shell, acting as a radiator disposed at an extreme end of a sensor assembly within the deep fryer vat, the metal cylindrical shell mounted in the deep fryer vat at a predetermined level within the deep fryer vat, and the metal cylindrical shell positioned proximate to an inner metallic wall of the deep fryer vat sensing capacitance of a space within the deep fryer vat between the capacitive sensor probe and the inner metallic wall of the deep fryer vat;
   a coaxial electrode electrically interconnected to the metal cylindrical shell, the coaxial electrode having a center conductor, a dielectric around the center conductor, and an outer conductor, the center conductor being in electrical continuity with the metal cylindrical shell;
   an insulator adjacent the metal cylindrical shell, electrically and thermally isolating the metal cylindrical shell from selected electrical and thermal properties in the deep fryer vat wherein the capacitive sensor probe is disposed; and
   a connector jack disposed distal from the metal cylindrical shell on the coaxial electrode, a portion of the connector being in electrical continuity with the metal cylindrical shell via the center conductor of the coaxial electrode;
   the connector jack of the capacitive sensor probe is in electrical communication with a control system and the sensor and control system measure capacitance of the space within the deep fryer vat between the metal cylindrical shell and the inner metallic wall of the deep fryer to determine a presence of liquid in the deep fryer vat at the level of the metal cylindrical shell.

2. The capacitive sensor probe of claim 1, further including a sensor mount disposed adjacent to the insulator, the insulator and sensor mount having interior hollow portions with the coaxial electrode extending through the interior hollow portions.

3. The capacitive sensor probe of claim 1, wherein the metal cylindrical shell includes a recess that is configured to receive a receptacle press fit into the metal cylindrical shell to provide for electrically conductive engagement of other components of the capacitive sensor probe with the metal cylindrical shell.

4. The capacitive sensor probe of claim 1, wherein the coaxial electrode is a coaxial cable.

5. The capacitive sensor probe of claim 4, wherein a portion of the coaxial cable forming the coaxial electrode is press fit into a receptacle press fit in the metal cylindrical shell to provide for electrically conductive engagement of the portion of the coaxial electrode of the capacitive sensor probe with the metal cylindrical shell.

6. The capacitive sensor probe of claim 1, wherein the insulator has threads that are configured to thread into a portion of the metal cylindrical shell.

7. The capacitive sensor probe of claim 1, wherein the insulator is constructed from a material that insulates against at least one of electrical transmission or heat transmission up to approximately 500 degrees Fahrenheit.

8. The capacitive sensor probe of claim 1, wherein the capacitive sensor probe is in electrical communication with the control system and the capacitive sensor probe and the control system are calibrated for determining presence of fluid in the deep fryer vat.

9. The capacitive sensor probe of claim 1, wherein the capacitive sensor probe is positioned proximate to an inner metallic corner of the deep fryer vat sensing capacitance of a space within the deep fryer vat between the capacitive sensor probe and the inner metallic corner of the deep fryer vat to determine if a liquid is present.

10. A capacitive sensor and system, comprising:
a capacitive sensor disposed within a vat and positioned within the vat, the capacitive sensor having a metal cylindrical shell acting as a metal radiator disposed at a predetermined level at an extreme end of a sensor assembly, a coaxial electrode electrically interconnected to the metal radiator, the coaxial electrode having a center conductor, a dielectric around the center conductor, and an outer conductor, the center conductor being in electrical continuity with the metal radiator, an insulator configured to fit adjacent the metal radiator, and configured to electrically and thermally isolate the metal radiator from selected electrical and thermal properties, and a connector disposed distal from the metal radiator on the coaxial electrode, a portion of the connector being in electrical continuity with the metal radiator via the outer conductor of the coaxial electrode and a second portion of the connector being in electrical continuity with the metal radiator via the center conductor of the coaxial electrode;
wherein the metal cylindrical shell is positioned proximate to an inner metallic wall of a deep fryer vat sensing capacitance of a space within the deep fryer vat between the capacitive sensor and the inner metallic wall of the deep fryer vat;
sensor electronics processing a signal in electronic communication with the capacitive sensor; and
a controller receiving the signal from the sensor electronics representing a capacitive value from the capacitive sensor and transmitting control signals to control operation of one or more devices based on the capacitive value.

11. The capacitive sensor and system of claim 10, wherein the controller allows operation of the one or more devices when the signal received from the capacitive sensor is representative of liquid being disposed within the vat at or above a level of the metal cylindrical shell.

12. The capacitive sensor and system of claim 10, wherein the controller prevents operation of the one or more devices when the signal received from the capacitive sensor is representative of liquid not being disposed in the space between the capacitive sensor and the inner metallic wall of the deep fryer within the vat at or above a level of the metal cylindrical shell.

13. The capacitive sensor and system of claim 10, wherein the metal cylindrical shell is positioned proximate to an inner metallic corner of the deep fryer vat sensing capacitance of a space within the deep fryer vat between the capacitive sensor and the inner metallic corner of the deep fryer vat.

14. The capacitive sensor and system of claim 10, wherein the insulator is constructed from a material that insulates against at least one of electrical transmission or heat transmission up to approximately 500 degrees Fahrenheit.

15. A method of constructing a capacitive sensor probe for sensing oil levels within a deep fryer vat, comprising:
providing a metal cylindrical shell acting as a radiator disposed at an extreme end of a sensor assembly;
wherein the metal cylindrical shell is disposed at a predetermined level within the deep fryer vat;
wherein the metal cylindrical shell is positioned proximate to an inner metallic wall of the deep fryer vat sensing capacitance within the deep fryer vat in a space between the capacitive sensor probe and the inner metallic wall;
configuring a coaxial electrode electrically interconnected to the metal cylindrical shell, the coaxial electrode having a center conductor, a dielectric around the center conductor, and an outer conductor, the center conductor being in electrical continuity with the metal cylindrical shell;
positioning an insulator adjacent the metal cylindrical shell, and configured to electrically and thermally isolate the metal cylindrical shell from selected electrical and thermal properties in an environment wherein the capacitive sensor probe is disposed; and
connecting a jack connector disposed distal from the metal cylindrical shell on the coaxial electrode with a portion of the connector being in electrical continuity with the metal cylindrical shell via one of the outer conductor of the coaxial electrode and the center conductor of the coaxial electrode; and
connecting the connector jack of the capacitive sensor probe to a control system calibrated for determining presence of liquid in the space.

16. The method of constructing a capacitive sensor probe of claim 15 further including a sensor mount disposed adjacent to the insulator, the insulator and sensor mount having interior hollow portions with the coaxial electrode extending through the interior hollow portions.

17. The method of constructing a capacitive sensor probe of claim 15, wherein the step of configuring a coaxial electrode electrically interconnected to the metal cylindrical shell involves electrically connecting a portion of coaxial cable to the metal cylindrical shell.

18. The method of constructing a capacitive sensor probe of claim 15, wherein the metal cylindrical shell is positioned proximate to an inner metallic corner of the deep fryer vat sensing capacitance of a space within the deep fryer vat between the capacitive sensor and the inner metallic corner of the deep fryer vat.

* * * * *